United States Patent [19] [11] 3,737,685
Sharp, Jr. [45] June 5, 1973

[54] APPARATUS AND METHOD FOR CONTROLLING AN ELECTRICAL POWER CIRCUIT

[76] Inventor: William L. Sharp, Jr., 117 Center St., Clinton, N.J.

[22] Filed: Aug. 11, 1971

[21] Appl. No.: 170,811

[52] U.S. Cl............250/83.3 UV, 250/71 R, 250/221
[51] Int. Cl...............................................G06m 7/00
[58] Field of Search...............250/71 R, 83.3 UV, 250/215, 221

[56] References Cited
UNITED STATES PATENTS

| | | | |
|---|---|---|---|
| 2,631,243 | 3/1953 | Weber et al. | 250/71 R |
| 3,109,094 | 10/1963 | Marshall et al. | 250/221 X |

Primary Examiner—Archie R. Borchelt
Attorney—Sperry & Zoda

[57] ABSTRACT

Apparatus is herein described for controlling an electrical power circuit in response to the electronic detection of a photo reflective substance on a predetermined portion of the human body. More specifically, a guide device is provided for positioning a portion of the human body in a predetermined location for the application of a photo reflective substance to a predetermined portion thereof. A source of radiation is provided and photo sensitive, electrical circuitry is positioned with respect to the last mentioned portion of the human body so that the photo sensitive circuitry becomes conductive upon sensing the reflection of radiation from the photo reflective substance. The dispensing apparatus for applying the photo reflective substance and the mechanical guiding means for positioning the portion of the human body with respect to the photo sensitive circuitry are arranged so that the portion of the human body concerned is relatively positioned in the same location, with respect to the dispensing apparatus, as it is with respect to the photo reflective sensing apparatus. In this manner, the photo sensitive circuitry is actuated only when radiation is reflected from the predetermined portion of the human body.

In one feature of the invention, the source of radiation includes ultraviolet rays having a wave length in the range of 3,000 to 4,000 angstroms.

In another feature of the invention, monochromatic filtering is provided whereby the photo sensitive circuitry is only actuated in response to the sensing of a particular color of photo reflective substance.

7 Claims, 7 Drawing Figures

PATENTED JUN 5 1973
3,737,685
SHEET 1 OF 2
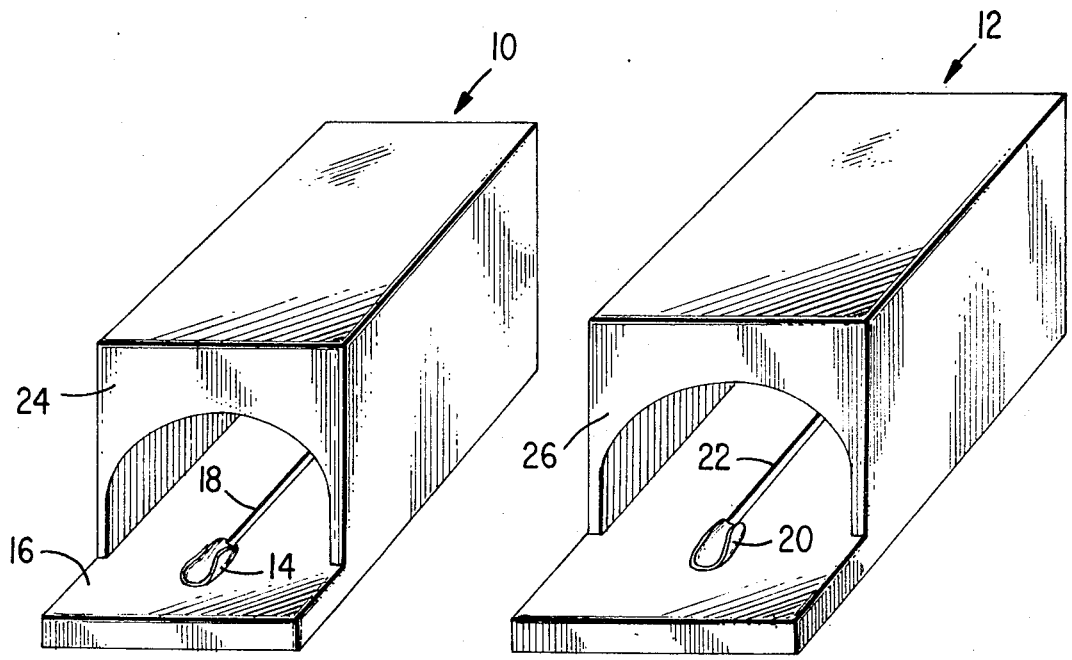
Fig. 1a.
Fig. 1b.
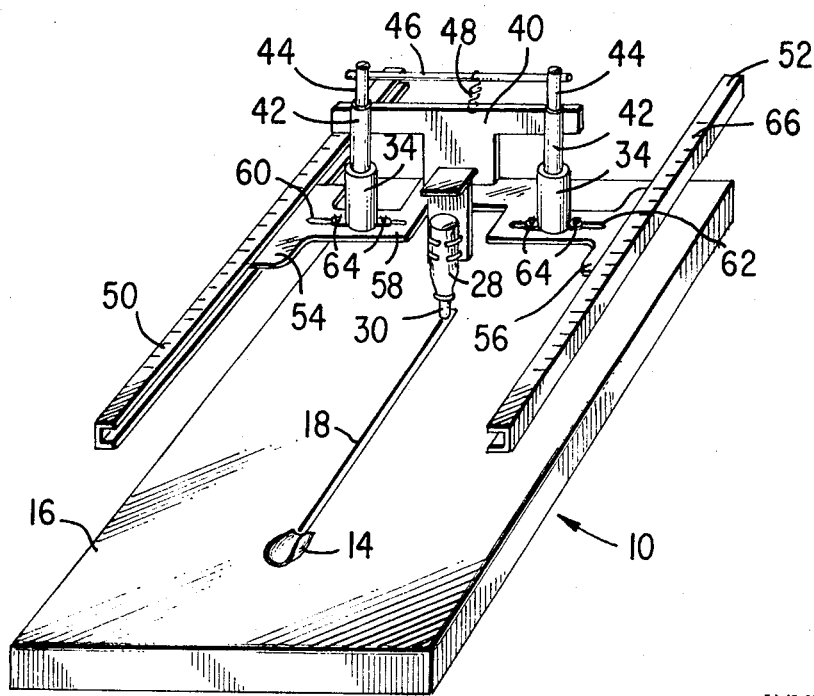
Fig. 2.
INVENTOR.
WILLIAM L. SHARP, JR.
BY
Sperry & Zoda
ATTORNEYS

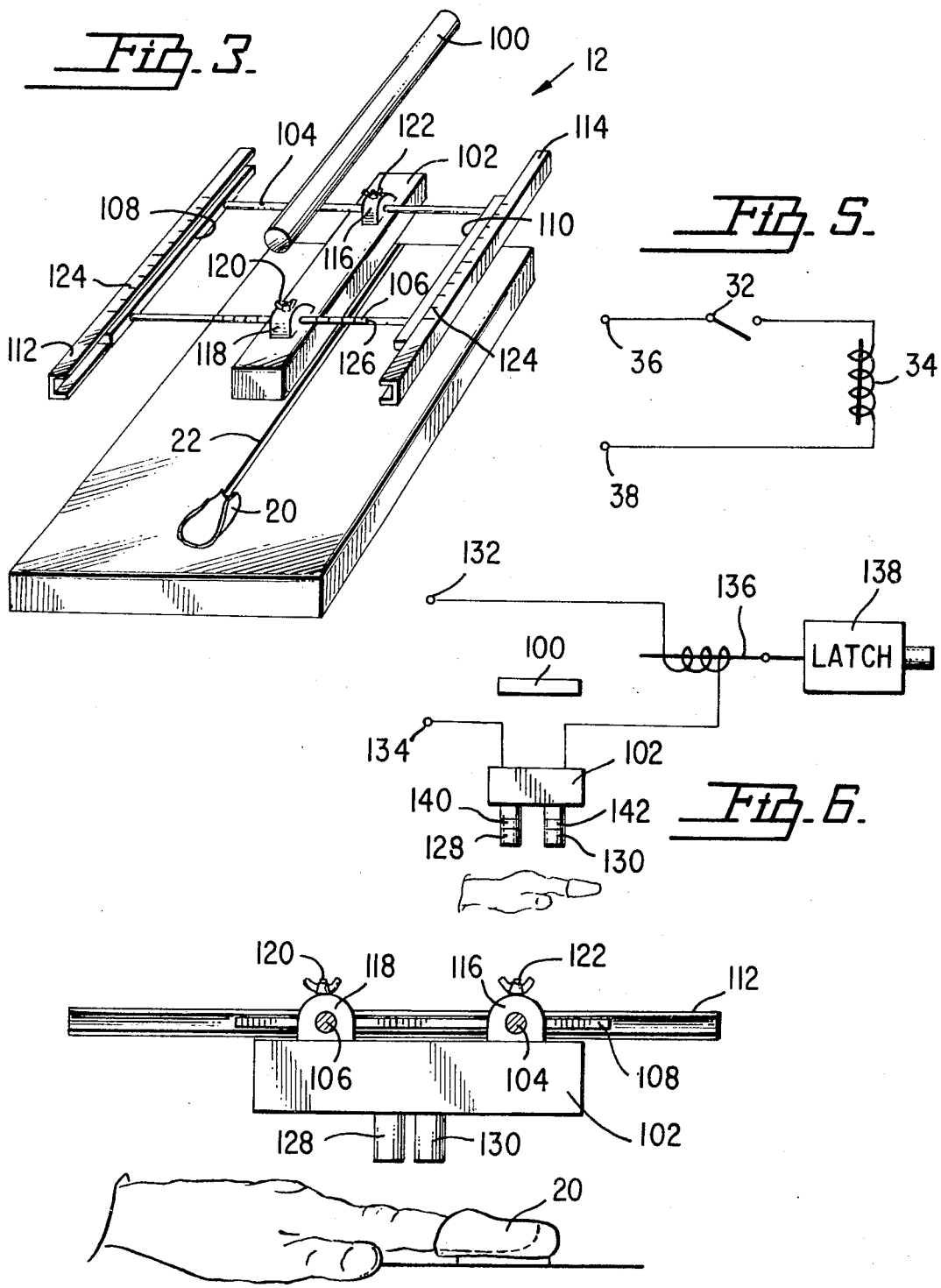

FIG. 6 is a basic electrical diagram of the essential circuitry associated with the photo sensing arrangement shown in FIG. 3.

DETAILED DESCRIPTION OF THE PREFERRED EMBODIMENT

Referring now to the drawings in which like numerals are used to indicate like parts throughout the various views thereof, FIG. 1 shows the overall exterior arrangement of the preferred embodiment of thee present invention to include a dispensing arrangement 10 and a photo sensing arrangement 12.

It will be noted taht a finger holder 14 is provided on a platform surface 16 of the dispensing arrangement 10 for receiving any one of an individual's fingers. The finger holder 14 is slidable on the platform 16 along a slot 18 formed therein. Upon reaching the full stroke of movement along the slot 18, the finger holder 14 is operable to actuate the dispensing apparatus which is shown, more particularly, in FIGS. 2 and 5 and which will be discussed later in the specification.

The arrangement 12 is provided with a similar configuration as the arrangement 10 wherein a second finger holder 20 is provided to slide along slot 22 for positioning the hand of the individual in a predetermined location within the overall apparatus 12 for the proper reading thereof, see FIG. 3.

It will be noted, that frontal, shield-like walls 24 and 26 are provided on each of the arrangements 10 and 12 to prevent the individual from viewing the positioning and color of the substance being dispensed in the arrangement 10.

Referring back to FIG. 2, which illustrates the essential elements of the arrangement 10, it can be seen that the finger holder 14 is movable along slot 18 on the platform surface 16 to position an individual's hand under a bottle 28 containing a liquid photo reflective substance.

The bottle 28 is positioned above the locus of an individual's hand so as to not normally engage therewith. A felt tip 30, or the like, may be presented at the bottom extremity of the bottle 28, which may be inverted for gravity feed through the tip 30.

When the finger holder 14 has been moved along the slot 18 to the full length of the stroke, it is operable to close a switch, indicated in FIG. 5 as 32, to actuate solenoids 34, when the terminals 36 and 38 (see FIG. 5) are properly connected with a source of electrical power.

The actuation of the solenoids 34 is operable to move the bottle 28 and its supporting structure 40 downwardly until the tip 30 engages with a predetermined portion of the hand. It will be noted that the solenoids 34 are operable to move tubular rods 42 downwardly along guide posts 44 until the solenoids 34 have completed the full stroke.

A cross rod 46 may interconnect the vertical guide posts 44. A helical spring 48, or the like, may be mounted between the cross rod 46 and the vertically movable support member 40 so that, after the solenoids 34 have moved the support 40 and bottle 28 downwardly into engagement with the individual's hand, the spring 48 is operable to return the bottle and support into the hand non-engaging, upper position.

While the operative features of the arrangement 10, as shown in FIG. 2, only include the essential elements, it is of course understood that various time delay components, and the like, could be included in the circuitry to insure that the substance dispensing tip 30 engages the individual's hand for the necessary period of time to apply a sufficient amount of photo reflective substance for the proper sensing thereof.

In order to properly position the tip 30 over a predetermined portion of the hand, an adjustment arrangement is provided which permits universal movement of the tip 30 in at least a single plane. More particularly, channel members 50 and 52 are provided for receiving slidable portions 54 and 56 of a support member 58 of the solenoid members 34.

The slidable guide portions 54 and 56 slide within the channel members 50 and 52 so that the tip 30 may be positioned longitudinally of the overall arrangement 10.

The solenoid base mounting member 58 may be provided with transversely extending slots, 60 and 62, and the solenoids may be mounted on the base 58 by means of adjustable wing nuts 64, or the like, which may be loosened to permit the transverse movement of the entire solenoid and bottle supporting structure.

By this arrangement, then, the locus of the dispensing tip 30 may be precisely positioned by the longitudinal movement of the sliding guide members 54 and 56 and by the transverse movement of the solenoid and bottle support assembly transversely along slots 60 and 62. It will be noted, that measurement indicia 66 may be presented on the channel members 50 and 52 and also on the solenoid mounting 58 which markings may be better understood when considered in connection with the discussion of the photo sensing arrangement of FIG. 3.

Referring to FIG. 3, it can be seen that the photo sensing arrangement 12 includes a source of radiation 100. The source 100 preferably consists of two 2F4T5/BLB fluorescent black light lamps manufactured by General Electric Company of New York, providing ultra-violet energy in the range of 3,000 to 4,000 angstroms and having a rating of approximately 225 florens each. For the purposes of illustration, only one such fluorescent lamp 100 is illustrated in FIG. 3.

The finger holder 20 is slidable along the slot 22 to properly position an individual's hand, as more particularly shown in FIG. 4. A reflected energy sensing element 102 is mounted for universal movement in a single plane in a manner identical with the available movement associated with the arrangement 10, as illustrated in FIG. 2.

The radiant energy sensing element 102 is slidably mounted on transversely extending rods 104 and 106. The rods 104 and 106, in turn, are supported within slidable guides 108 and 110. Channel members 112 and 114 are provided and are positioned longitudinally of the arrangement 12 in a manner identical with the arrangement of channels 50 and 52 within the arrangement 10.

The sensing element 102 is provided with upwardly extending lugs 115 and 118, having transversely extending apertures for slidably receiving the transversely extending support rods 104 and 106. Set screw arrangements, for example wing nuts 120 and 122, may be provided for locking the element 102 in the transverse direction along the rods 104 and 106.

Measurement indicia 124 may be displayed on the channel members 112 and 114 while indicia 126 may be displayed on the transverse rods 104 and 106.

APPARATUS AND METHOD FOR CONTROLLING AN ELECTRICAL POWER CIRCUIT

BACKGROUND OF THE INVENTION

The present invention relates to an apparatus for automatically controlling an electrical power circuit and, more particularly, relates to an apparatus and method for controlling an electrical ppwer circuit in response to the sensing of a photo reflective substance on a predetermined portion of the human body.

The problem of admitting authorized personnel into certain areas has given rise to a proliferation of apparatus for selectively permitting certain individuals to pass through doors, turnstyles and the like. Such apparatus has found particular usage in carnivals, night clubs, and even in certain ultra-hazardous or high security areas of industrial plants, and the like.

Heretofore, it has been generally necessary for a guard or ticket checker to be present at entrances to such areas in order to permit only authorized personnel to pass. The expense in employing such inviduals is prohibitively high. Even at that, the use of such individuals is sometimes ineffective if the individual should be prone to admitting those who might extend the individual a favor.

Alternatively, keys, cards, and the like, may be issued to authorized personnel which keys and cards may be inserted within certain apparatus for unlatching doors, turnstyles and the like. The main disadvantage with such apparatus is that the key or card may be lost or, may be passed onto other users so that unauthorized personnel may be provided with teh proper credentials for entering restricted areas.

Recently, certain night clubs have perfected a method of applying photo reflective substances to the hand of those who have paid for admission to the respective night club. The photo reflective substance is usually invisible under ordinary white light, but is quite distinctive when placed under ultra-violet radiation, commonly referred to as black light.

The advantage of such a procedure is that one who pays proper admission to the night club may come and go as he likes without having to worry about losing a ticket or key and without being able to pass ticket-like devices onto other, non-paying individuals. Of course, one defect in the system is that, as soon as one individual pays the admission and sees what type substance has been applied to his hand snd where it has been applied, this individual can notify others that, if they apply a similar substance to the predetermined position, they too can gain entry.

Furthermore, such a system still requires that a guard, or the like, be positioned at the entrance to the night club so as to preclude those not having the proper photo reflective substance on their hand from gaining entry.

It would therefore be advantageous if apparatus were provided which would apply a predetermined color of a photo reflective substance to a predetermind portion of an individual's hand and then which would be operable to actuate an electrical power circuit in response to the sensing of that substance in the proper location of the hand.

OBJECTS AND SUMMARY OF THE INVENTION

It is therefore an object of the present invention to provide an apparatus and method which will solve some of the problems confronting organizations which require restricted admission into particular areas for preselected individuals.

It is another object of the present invention to provide an uncomplicated apparatus and method for controlling electrical power circuits.

It is still another object of the present invention to provide an apparatus and method for controlling electrical power circuits which apparatus and method present a low expense so as to be practical for adaptation by small organizations.

It is yet another object of the present invention to provide an apparatus and method for permitting selective access to certain areas which apparatus and method are virtually fool proof.

It is a further object of the present invention to provide an apparatus and method for permitting only admission paying individuals into certain areas which apparatus and method present an economic savings in that an entrance guard need not be employed for the purpose.

It is still a further object of the present invention to provide apparatus for controlling electrical power circuitry which apparatus is easy to manufacture.

It is yet a further object of the present invention to provide apparatus for controlling electrical power circuitry which apparatus includes components which are easy to replace and repair.

At least some of the above cited objects aree achieved by the provision of apparatus for controlling an electrical power circuit in response to the electronic detection of a photo reflective substance on a predetermined portion of the human body into a predetermined location. A dispensing mechanism is associated with a guide means for applying a photo reflective substance for the predetermined portion of the human body in response to the proper positioning of that portion of the body by the guide means. A source of radiation is provided adjacent electronic means which is operable to actuate a power circuit in response to detection of a photo reflective substance on that predetermined portion of the human body.

BRIEF DESCRIPTION OF THE DRAWINGS

While the invention is particularly pointed out and distinctly claimed in a concluding portion of the specification, a preferred embodiment is set forth in the following detailed description which may be best understood when read in conjunction with the accompanying drawings in which:

FIG. 1 is a perspective view of the overall apparatus comprising the preferred embodiment, FIG. 1a illustrating the dispensing apparatus and FIG. 1b the sensing apparatus, of the present invention;

FIG. 2 is a perspective view of the essential elements of a basic, photo reflective substance, dispensing portion of the preferred embodiment;

FIG. 3 is a perspective view of the essential elements of a photo sensing portion of the preferred embodiment;

FIG. 4 is a side elevation view showing an individual's hand properly positioned for actuating the photo sensing arrangement shown in FIG. 3;

FIG. 5 is a basic electrical diagram of the essential circuitry included in the dispensing arrangement shown in FIG. 2; and The indicia 124 and 126 of the arrangement 12 may correspond identically with the indicia 66 and 68 of the arrangement 10 so that the felt tip 30 and the photo sensitive element 102 may be precisely located in the same position relative to an individual's hand guided by the finger holder elements 14 or 20. This, in turn, insures that the photo sensitive element 102 would be actuated only by photo reflective substance properly positioned by the dispensing tip 30.

Referring now to FIGS. 4 and 6, it will be noted that the photo sensitive element 102 may present two photo sensitive cells 140 and 142, mounted therefrom. Although a single cell may be effective in sensing a spot of photo reflective substance, in the presence of black light generating from a lamp such as lamp 100 of FIG. 3; it has been found that the use of a comparative type sensing arrangement is more effective in discriminating so as to be actuated only when the photo reflective substance is presented in a precise predetermined position on an individual's hand. Such a comparative type electronic arrangement may be of the conventional type wherein, when a predetermined differential of reflected energy quantum is received by the photo sensitive elements 145 and 142, the sensing element 102 becomes conductive.

Referring to FIG. 6, it can be seen that, when terminals 132 and 134 are connected across a source of electrical power, and the photo sensitive element 102, presenting the photo cells 140 and 142, becomes conductive due to a sensing of a predetermined difference of quantum of reflected energy, the solenoid 136 may be actuated to operate any suitable mechanical device such as a latch 138.

In one feature of the preferred embodiment, monochromatic filters 128 and 130 may be associated with the photo cells 140 and 142, respectively, so that only a certain color of photo reflective substance will pass radiant energy through the filters 128 and 130 to actuate the sensing element 102. This, then, provides an added dimension of variation so that the individual is less likely to be able to fool the apparatus into "thinking" that that individual is presenting the proper credentials for actuating the power circuit associated with the latch means 138.

It is preferred that cadmium sulphide photo conductive cells be utilized as the cells 140 and 142. However, any other photo sensitive devices may be used, in singular or plural form, and any filter system may be included therewith, without departing from the invention.

It should be understood that the apparatus, herein described for the purposes of illustration, is only the most basic form of the present invention.

Accordingly, certain modifications and changes may be made in this basic arrangement without departing from the invention. It is therefore intended to cover in the appended claims all such modifications and changes as may fall within the true spirit and scope of the present invention.

SOME ADVANTAGES OF THE PRESENT INVENTION

It can be therefore seen that an apparatus has been herein provided which may be utilized to actuate an electrical power circuit in response to the sensing of a particular color of photo reflective substance on a specific portion of an individual's hand. The apparatus and method according to present invention is uniquely uncomplicated so as to be inexpensive and virtually fool proof. By use of apparatus according to present invention, institutions may realize significant savings in reducing the requirements for having guards for restricting access to various spaces. Furthermore, the apparatus according to present invention precludes the situation where a guard or checker may have tendencies to permit access to unauthorized persons who may be friends of that individual.

Due to the unique simplicity of the present arrangement, the apparatus is easy to assemble and presents the various components thereof for ease of replacement and repair.

Although many of the elements, comprising the present invention, are not new in themselves, these have been arranged in a synergistic manner so that the resulting function of the overall combination is greater than the sum of the functions of the various parts thereof.

What I claim is:

1. Apparatus for controlling an electrical power circuit in response to the electronic sensing of a photo-reflective substance presented on a predetermined portion of the human body, comprising: guide means for positioning a portion of the human body in a predetermined location; dispensing means associated with said guide means for applying a photo-reflective substance to a predetermined portion of the human body in response to the positioning thereof by said guide means; a source of radiant energy; electronic means operable to actuate a power circuit in response to the sensing of a photo-reflective substance on the predetermined portion of the human body; and second guide means associated with said electronic means for positioning the portion of the human body in the same identical predetermined position relative to said electronic means as presented by the relative position thereof with respect to said dispensing portion of said dispensing means.

2. Apparatus according to claim 1 wherein said guide means and said dispensing means include electrical circuitry adaptable for connection with a source of electrical power and operable to actuate solenoid means in response to the closing of said circuit by a switching means;

said switching means being closed in response to the proper positioning of a portion of the human body by said guide means; and said solenoid means operable to position a dispensing portion of said dispensing means in engagement with the predetermined portion of said human body in response to the closing of said switching means when said electrical circuit is properly connected with a source of electrical power.

3. Apparatus according to claim 2 wherein said guide means includes a holder means for receiving a portion of the human body and operable to slidably guide said portion along a predetermined track as said holder means in moved there - along to a predetermined final position.

4. Apparatus according to claim 2 wherein said solenoid means and said dispensing portion of said dispensing means including first mounting means universally adjustable for movement in a single plane; said electronic means including photo-sensitive cell means and a second mounting means for adjustably moving said photo-sensitive cell means in a single plane; whereby radiant energy reflecting from said photo-reflective substance is operable to actuate the electrical power circuit in response to the actuation of said photo-sensitive cell means; and whereby said cell means is only actuated when said cell means receives radiant energy from photo-reflective substance precisely positioned in the predetermined portion of the human body.

5. Apparatus according to claim 4 wherein said photo sensitive cell means includes two photo sensitive cells associated with comparator circuitry; whereby said electronic means is actuated only when a predetermined difference in quantum of radiant energy is sensed between said two cells.

6. Apparatus according to claim 4 wherein said photo-sensitive cell means is provided with monochromatic filter means so that only a predetermined color of photo reflective substance will actuate said electronic means in response to the reflection of radiant energy therefrom through the said photo cell means.

7. Apparatus according to claim 5 wherein said source of radiant energy includes a source of ultra violet energy having a wave length in the range of from 3,000 to 4,000 angstroms.

* * * * *